3,018,134
KNEE REST FOR AUTOMOBILES
Lester D. Shiplett, 9018 St. Andrews Place, Silver Spring, Md., and Berthold H. Ochterbeck, Takoma Park, Md. (2723 Nicholson St., West Hyattsville, Md.)
Filed Mar. 1, 1960, Ser. No. 12,058
3 Claims. (Cl. 297—427)

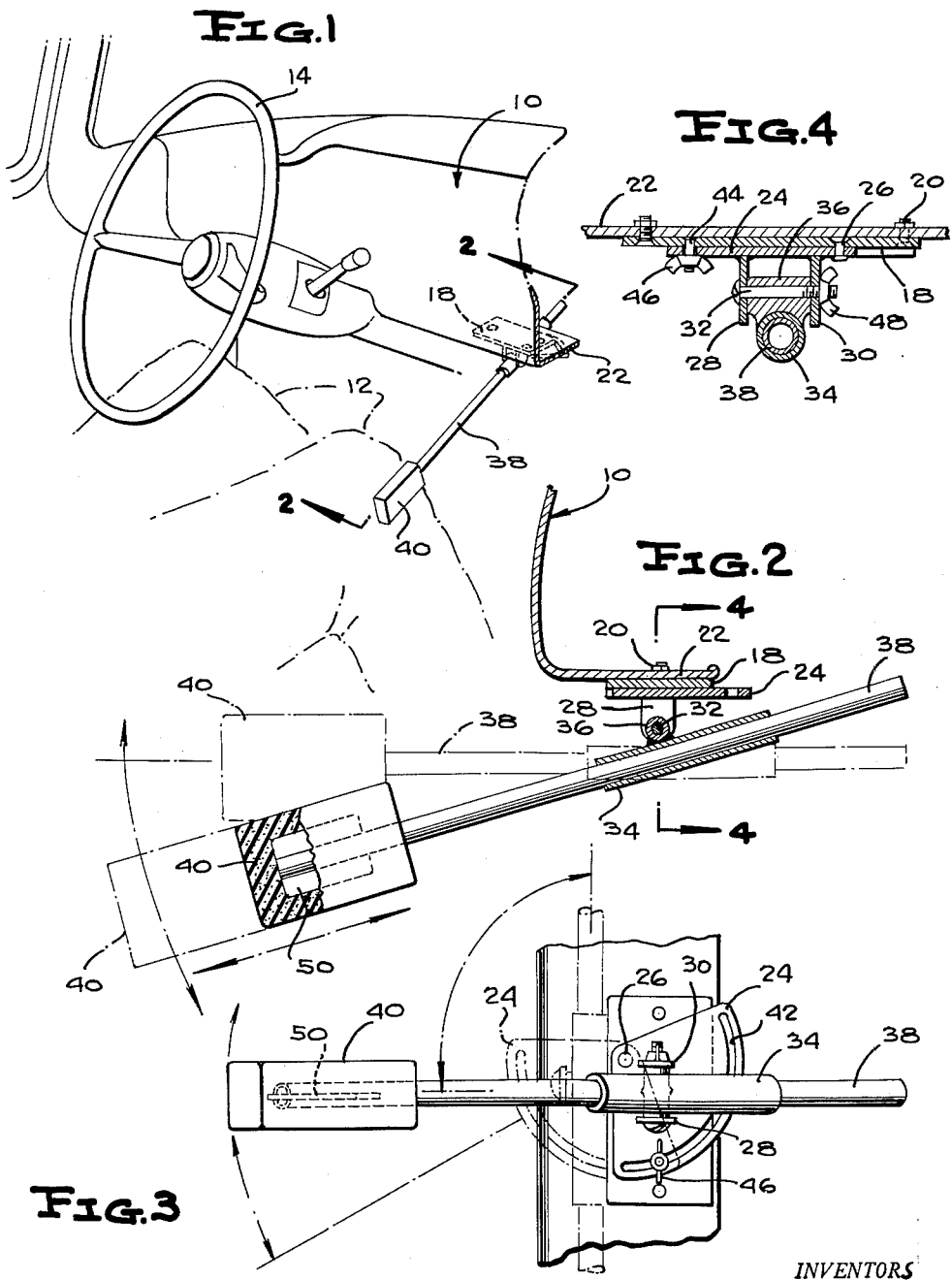

The present invention relates to vehicles generally, and in particular to a knee or leg rest for the operator of an automobile.

Operators of automobiles and other vehicles have found that the addition of a rest for the knee affords a measure of comfort to the operator of the vehicle when traveling over a highway of any length. The frequent application of pressure to the accelerator and to the brake of the vehicle soon tires the operator's leg unless a rest is provided for the knee. In the past, rests for the knee have been proposed, but none has found wide acceptance by the public. Principally, a defect in the rests proposed is that they are conspicuous when not in use, relatively hard to adjust to the position of comfort desired by the operator, and complicated in structure.

An object of the present invention is to provide a knee rest for installation in an automobile which provides an optimum degree of comfort to the operator of the vehicle, one which is installed with ease and facility on the lower end of the vehicle instrument panel, one which is readily adjusted to any position so as to accommodate the knee of any size operator, and one which is highly effective in action.

Another object of the present invention is to provide a knee rest for installation in an automobile having an instrument panel which is readily shifted between operative and inoperative positions, one having few components, economical to manufacture and assemble, and one which lends itself to installation in any automotive vehicle having an instrument panel.

These and other objects and advantages of the present invention will be fully apparent from the following description when taken in conjunction with the annexed drawing, in which:

FIGURE 1 is an isometric view of the interior of an automotive vehicle showing the device of the present invention installed therein, the dotted line showing designating the legs of an operator of the vehicle, FIGURE 2 is a view on an enlarged scale, taken on the line 2—2 of FIGURE 1, the dotted line showing indicating the swinging movement of the knee rest in a vertical plane, FIGURE 3 is a plan view, as viewed from the bottom, showing the knee rest of the present invention, the dotted line showing indicating the swinging movement of the knee rest in the horizontal plane, and FIGURE 4 is a view taken on the line 4—4 of FIGURE 2.

Referring in greater detail to the drawing in which like reference numerals indicate like parts throughout the several views, in FIGURE 1 the reference numeral 10 represents the instrument panel of an automobile, and the numeral 12 designates the dotted lines which represent the legs of the operator of the automobile when seated in driving position behind the steering wheel 14.

The knee rest or knee rest assembly of the present invention is designated generally by the reference numeral 16 and it comprises a base plate 18 secured by bolt and nut assemblies 20 to the horizontal portion 22 of the instrument panel 10.

To the plate 18 is secured a mounting means or bracket 24 so that the bracket 24 is positioned adjacent to and below the panel 10. A vertically-disposed pivot pin or loose rivet 26 connects one side portion of bracket 24 to the plate 18 for swinging movement in a horizontal plane, or from the full line position in FIGURE 3 to the dotted line position.

A pair of lugs 28, 30 project downwardly from the other face of the bracket 24, each being provided with a hole for receiving therethrough the shank of a bolt 32.

The mounting means includes a sleeve 34 having intermediate its ends a transversely arranged block element 36 having a bore extending therethrough. The shank of the bolt 32 extends through the bore in the block element 36 and supports the sleeve 34 for tilting movement in a vertical plane. It is to be noted that the block element 36 on the sleeve 34, and the bolts 32 extending through the bore in the element 36 and supported in the lugs 28 and 30 constitute means connecting the sleeve 34 to the lugs 28 and 30 for tilting movement of said sleeve in a vertical plane.

A rod element 38 is slidably movable through the sleeve 34 and may also be rotated in the sleeve 34. A resilient pad 40 is carried upon one end portion of the rod element 38.

The rod element 38 is also slidably mounted in the sleeve 34 for projection and retraction, the retracted position being shown in full lines in FIGURE 2, and one position of projected movement being shown in dotted lines.

Preferably, the pad 40 is fabricated of a resilient material, such as rubber, neoprene, or the like.

Releasable locking means is provided operatively connected to the bracket 24 for holding the latter in any position of its horizontal plane movement. This releasable locking means includes an arcuate slot 42 provided in the bracket 24, and a bolt 44 having its shank projecting through an appropriately arranged hole in the plate 18 and extending through the slot 42.

A wing nut 46 is threadably engaged on the shank of the bolt 44 and, when tightened, secures the bracket 24 in any position of its movement in a horizontal plane about the rivet 26 as a vertical axis.

The present invention also provides releasable locking means operatively connected to the sleeve 34 for holding the sleeve 34 in any position of its vertical plane movement.

Specifically, this means includes another wing nut 48 threadably engaged on the threaded end portion of the bolt 32 and, when tightened, secures the sleeve 34 in any position of its tilting movement about the bolt 32 as a horizontal axis.

In a preferred form of the invention, the means securing the pad 40 to the rod element 38 consists in a fin structure 50 fixedly secured in a slot provided in the adjacent end portion of the element 38 and having a width substantially less than the pad 40, so that the pad 40 entirely encompasses the fin 50 and is held from movement of the rod element 38 by the fin 50.

It is to be understood that other means of securing the pad 40 to the rod element 38 may be employed, as found practical.

In use, the plate 18 is secured to the instrument panel portion 22 by means of the bolt and nut assemblies 20. The bracket 24, secured to the plate 18 by the rivet 26 and the bolt 44, may be rotated in the horizontal plane so as to locate the pad 40 in a position affording optimum comfort to the adjacent leg 12 of the occupant of the automobile. The bracket 24 may be secured in position by tightening of the wing nut 46 on the bolt 44. The rod element 38 may also be adjusted upwardly and downwardly in a vertical plane by loosening and tightening of the wing nut 48.

Additionally, the rod element 38 is freely slidable through the sleeve 34 to any position of use or to a position concealed by the instrument panel 10 of the automobile in which it is installed.

The rod element 38 may also be rotated within the sleeve 34 so as to adjust the pad 42 to the contour of the leg of the individual occupying the operator's seat of the automobile.

What is claimed is:

1. The combination with a vehicle instrument panel, of a knee rest assembly comprising a plate fixedly secured to said panel, a mounting means embodying a bracket positioned below and adjacent to said plate, means connecting said bracket to said plate for swinging movement of said bracket in a horizontal plane, a support embodying a sleeve dependingly connected intermediate its ends to said bracket for tilting movement in a vertical plane, and a rod element having a resilient pad on one end, said rod element being slidably and rotatably and projectably and retractably supported in said support.

2. The combination with a vehicle instrument panel, of a knee rest assembly comprising a plate fixedly secured to said panel, a mounting means embodying a bracket positioned below and adjacent to said plate, a vertically-disposed pivot pin connecting said bracket to said plate for swinging movement of said bracket in a horizontal plane, a support embodying a sleeve dependingly connected to said bracket for tilting movement in a vertical plane, a rod element having a resilient pad on one end, said rod element being slidably and projectably and retractably supported in said support, and releasable locking means operatively connected to said bracket for holding the latter in any position of its horizontal plane movement.

3. The combination with a vehicle instrument panel, of a knee rest assembly comprising a plate fixedly secured to said panel, a mounting means embodying a bracket positioned below and adjacent to said plate, a vertically-disposed pivot pin connecting said bracket to said plate for swinging movement of said bracket in a horizontal plane, a pair of lugs depending from said bracket, a support embodying a sleeve disposed below and adjacent said lugs, means connecting said sleeve to said lugs for tilting movement of said sleeve in a vertical plane, a rod element having a resilient pad on one end, said rod element being slidably and rotatably and projectably and retractably supported in said support, and releasable locking means operatively connected to said sleeve for holding the latter in any position of its vertical plane movement.

References Cited in the file of this patent

UNITED STATES PATENTS

| | | |
|---|---|---|
| 349,986 | Dickey | Sept. 28, 1886 |
| 1,491,399 | Hein | Apr. 22, 1924 |
| 2,133,443 | Girl | Oct. 18, 1938 |
| 2,592,045 | Le Moir | Apr. 8, 1952 |
| 2,701,605 | Belmont | Feb. 8, 1955 |
| 2,934,132 | Farmer | Apr. 26, 1960 |